United States Patent [19]
Proulx et al.

[11] Patent Number: 6,124,034
[45] Date of Patent: Sep. 26, 2000

[54] PROCESS FOR FORMING DOUBLE-STRAND EDGED MONOFILAMENT LINE FOR USE IN LINE TRIMMERS

[75] Inventors: Richard A. Proulx; Paul T. Conlon, both of Alta Loma, Calif.

[73] Assignee: Proulx Manufacturing, Inc., Rancho Cucamonga, Calif.

[21] Appl. No.: 09/285,813

[22] Filed: Apr. 2, 1999

Related U.S. Application Data

[63] Continuation of application No. 08/932,773, Sep. 23, 1997, Pat. No. 5,891,288.

[51] Int. Cl.$^7$ .................................................. A01D 34/63
[52] U.S. Cl. ........................ 428/400; 428/397; 56/12.7; 56/295; 30/276
[58] Field of Search ................................. 156/292, 308.2, 156/308.4; 30/276, 347; 56/12.7, 294, 295, DIG. 17; 428/397, 400

[56] References Cited

U.S. PATENT DOCUMENTS

| | | |
|---|---|---|
| 3,690,978 | 9/1972 | Nishizawa et al. . |
| 4,186,239 | 1/1980 | Mize et al. . |
| 4,282,653 | 8/1981 | Comer et al. . |
| 4,869,055 | 9/1989 | Mickelson . |
| 5,463,815 | 11/1995 | Fogle . |
| 5,814,176 | 9/1998 | Proulx . |

*Primary Examiner*—Sam Chuan Yao
*Attorney, Agent, or Firm*—Lyon & Lyon LLP

[57] ABSTRACT

A process for forming flexible cutting line for use in rotary vegetation trimmers of the type having two or more monofilament lines mounted on a common spool. The line produced by the process of the present invention defines two monofilament strands joined together in a side-by-side relationship by a severable bond. Each strand defines a plurality of circumferentially spaced and outwardly projecting vegetation cutting edges thereon, two of the edges on one of the strands being in parallel contact with two of the edges on the other strand so as to define a pair of parallel readily severable welds bonding the strands together in a side-by-side disposition. The line forming process includes the steps of extruding the strands such that two of the edges on one strand are in proximate disposition and opposed parallel alignment with two of the edges on the other strand, directing the extruding strands together in edge-to-edge parallel contact along the opposed edges such that an enclosed space is defined between the strands so that the heat in the strands can create a positive pressure in the enclosed area to prevent inseparable fusion of the strands. The strands are then directed in edge-to-edge contact into a cooling quench bath, and pulled through the bath to effect crystallization and bonding together of the strands in an adjacent disposition along two readily severable parallel welds defined by the contacting edges.

5 Claims, 7 Drawing Sheets

PROCESS FOR FORMING DOUBLE-STRAND EDGED MONOFILAMENT LINE FOR USE IN LINE TRIMMERS

BACKGROUND OF THE INVENTION

This application is a continuation application of U.S. patent application Ser. No. 08/923,773 filed Sep. 23, 1997, now U.S. Pat. No. 5,891,288.

The present invention is directed to an assembly and process for forming flexible cutting line for use in rotary trimmers which is comprised of two monofilament strands joined by a severable bond wherein each strand defines a plurality of raised elongated cutting edges.

Flexible line rotary trimmers are used for cutting vegetation such as grass and weeds, particularly along walks, fences and flower beds and around trees. These devices comprise a motor driven rotary head which carries one or more lengths of monofilament line mounted on a spool within a housing. Extended end portions of each line project from the spool through guides in the side of the housing. As the head rotates at high speed, the end portions of the lines are caused to project outwardly from the housing by the centrifugal forces acting thereon and function as cutting blades. The majority of trimmer heads presently in use employ two separate monofilament nylon lines which are both mounted on a common spool and project from the spool and housing through diametrically opposed guides in the trimmer head housing.

The spool which carries the line is mounted within the housing such that it rotates with the housing during use but can be selectively rotated relative the housing to pay out additional line when the projecting end portions of the line become worn or severed. Because these heads typically employ two separate cutting lines, and occasionally three or four such lines, care must be taken in winding the lines about the common spool to prevent the lines from crossing over one another or otherwise tangling within the housing. If the lines become tangled within the housing, additional line cannot be payed out during use or even pulled from the head without having to disassemble the head. This problem is particularly acute in fully automatic and bump-feed heads wherein even the slightest tangle can interfere with the proper indexing and paying out of the line. In addition to interfering with the proper line feeding mechanisms of the flexible trimmer heads, internal tangles can also cause balance and vibration problems which make the trimmer more difficult to use.

To solve the problem of line tangle, monofilament line has been developed which comprises two strands secured together along their adjacent lengths by a readily severable weld. The resulting double strand line is then simply wound about the spool and the end portions separated along their weld so that the end portions of the separated strands can be fed out through the opposed guides. Bonding the two strands together in this manner along their entire lengths prevents tangling of the strands within the housing and, if the strands are properly joined, allows the strands to be readily separated for the feeding of new line through the opposed guides. Such a double or dual-strand line and methods and apparatures for manufacturing such line are disclosed in applicant's pending applications, Ser. No. 08/597,178, filed Feb. 6, 1996, now U.S. Pat. No. 5,814,176, and Ser. No. 08/782,333 filed Jan. 13, 1997, now U.S. Pat. No. 5,807,462.

In an effort to improve the cutting ability of monofilament line, the line has been extruded so as to define a plurality of raised cutting edges extending longitudinally along the line. Different cross-sectional configurations such as squares, diamonds and star shapes, have been developed to provide these multiple cutting edges. In certain designs, two sets of alternating elongated edges are provided. The first set protrudes beyond the second set and the recessed edges in the second set are disposed between the edges in the first set. Accordingly, when the more outwardly protruding edges in the first set become worn down and rounded with use, the second set of sharp edges will come into contact with the vegetation and thus effectively provide a set of fresh, sharp cutting edges with which to trim the vegetation.

Edged cutting line is becoming increasingly popular. However, such line is subject to the entanglement problems discussed above and a method for economically forming a suitable dual line with edged strands has not heretofore been developed. The first dual-strand lines were formed by securing two strands together along their adjacent lengths by a suitable adhesive. Such line, however, was found to be excessively expensive to manufacture and the strength of the adhesive bond between the two strands was inconsistent and caused premature separation of the strands. As a result, such a process is equally ill-suited for use in forming a dual-strand edged line.

In the forming process previously developed by applicant, which is the subject of the above identified patent applications, the problems with adhesively formed dual-strand lines were overcome through the use of a novel extrusion process. One or more pairs of nylon strands are extruded with the strands in each pair being in proximate disposition. The strands are directed from the extrusion die into a cooling quench bath where the two strands in each pair are brought together on a collecting guide in a side-by-side abutting disposition to initiate the forming of a continuous weld therebetween. The pairs of adjoining strands are then pulled through the quench bath as the strands in each pair begin to crystallize and bond together to form a plurality of pairs of joined monofilament strands. It has been found, however, that while that process provides an excellent weld for monofilament strands having a circular cross-section, it is not particularly well-suited for bonding together pairs of nylon polymer edged strands having a plurality of raised cutting edges extending therealong.

In the above-discussed process, the two strands are brought together in a side-by-side disposition within the cooling quench bath to sufficiently crystallize the strands prior to contact to prevent the two strands from permanently fusing together upon contact. As the pairs of closely spaced molten strands extend downwardly from the extrusion die to the collecting guide where the strands in each pair are brought into contact below the surface of the cooling water, the individual strands tend to twist. While this is of little consequence when dealing with strands which are circular in cross-section, if the strands define elongated projecting ribs and one or both of the strands becomes slightly twisted, the ribs on the two strands will not align when brought together but cross over one another. The result will be an inconsistent weld and an unsatisfactory product. While it may be possible to avoid such twisting with extensive care in the handling of the strands within the cooling bath, the care required would not be compatible with an economically viable manufacturing process and twisting might still occur. It was discovered, however, that proper alignment of the strands is not the only problem in attempting to extrude such a product.

As noted above, edged cutting line can be formed in numerous cross-sectional configurations. Depending on their shape, a pair of edged strands could be joined together in a dual-line configuration along a pair of abutting flat surfaces, along abutting edges or a pair of curved surfaces, or possibly along combinations of such surfaces. If the strands could be joined along a rounded surface, like a conventional dual-strand line, applicant's previously discussed extrusion process could be employed to produce the line, provided the line twisting problem could be solved. However, when joining the strands together along a curved surface, the available remaining space for the projecting edges is quite limited and thus the number of projecting edges which could be formed on each strand would be very limited. In addition, it is generally preferred to provide a uniform distribution of the cutting edges about the strands. As a result, the more popular edged lines are square in cross-section or of a diamond or of a star-like shape so as to define multiple raised edges evenly spaced about the outer surface of the line. Attempting to bond a pair of edged strands together along abutting flat surfaces, however, would result in inseparable fusion, even though the contact between the strands occurred in the quench bath, due to the large area of surface contact between the two molten strands. Attempts to bond edged strands along edge-to-edge contact using the aforesaid extrusion process would also prove unsuccessful. The contact area between the two strands was found to be too small to provide a suitable weld unless the edges were relatively rounded. There is a perception, however, that sharp edges provide superior vegetation cutting. If the two edged strands were pressed together along their abutting edges in an effort to strengthen the weld, there was a substantial risk that inseparable fusion would result.

Efforts were then made using applicant's previously developed extrusion process to form pairs of star-type edged strands in a dual line configuration along a pair of abutting edges or star points, as opposed to joining the strands in single edge-to-edge contact. The resulting configuration would comprise two isolated welds extending along the points of contact, separated by the recessed wall surfaces of the strands. The total surface area of contact between the strands would be twice that of single edge-to-edge contact which was believed to be a sufficient area of surface contact to produce a severable bond between the strands of adequate strength to prevent premature separation, yet not such a large single contact area, as in side to side contact, that would cause inseparable fusion. However, initial testing of the proposed new process did not produce the desired results, even when strand twisting was carefully avoided. It was found that when the two strands are joined along their projecting edges in the quench bath, the water becomes trapped between the strands in the area enclosed by the abutting edges and the oppositely facing recessed sides of the two strands. The trapped water is caused to boil by the heat of the molten strands, creating an increase in pressure between the two strands which prevents the strands from properly bonding together.

Thus, even though a very consistent, durable yet readily severable weld can be created between two conventional nylons strands to form a highly successful, tangle-resistant dual-strand monofilament cutting line, the same result have not heretofore been obtained with strands defining multiple raised cutting edges. The process disclosed herein achieves that result.

SUMMARY OF THE INVENTION

Briefly, the present invention comprises an assembly and process for forming one or more lengths of double-strand monofilament edged cutting line for use in rotary trimmers. The line is of single piece construction and comprises two nylon polymer strands joined together in a side-by-side disposition by a readily severable bond. Each of the joined strands defines a plurality of outwardly projecting and longitudinally extending edges thereon.

The process for forming this dual-strand edged line comprises the initial step of extruding one or more pairs of molten monofilament nylon strands wherein the strands in each pair are in proximate disposition and each strand defines at least one recessed area disposed between a pair of projecting edges. The extruded molten strands in each of the extruded pairs are directed into an abutting side-by-side disposition such that the pair of the projecting edges adjacent the recessed area on one strand is aligned with and abuts the corresponding pair of edges on the other strand. The recessed areas therebetween are in opposed disposition, thus defining an enclosed area between the strands. Upon being brought into parallel edge-to-edge contact, the abutting strands are immediately directed into and pulled along a cooling quench bath to initiate the crystallization and bonding together of the two strands along the continuous welds being formed between the adjacent edges.

The pairs of joined strands are then pulled from the bath and concurrently heated and stretched as they are pulled through a heated oven to obtain the desired cross-sectional dimension and parallel molecular orientation. The strands are then reheated in a relaxed disposition as they are more slowly pulled through a second oven. The formed double-strand edged lines are next quenched by being pulled through a second bath to enhance their flexibility, toughness and impact resistance and then separately spooled.

By configuring the individual extruding molten polymer strands so as to define recessed areas between projecting edges, a wide variety of cross-sections for edged strands can be created, including substantially square and diamond shapes, in addition to a variety of star shapes. Upon bringing such strands into contact along those projecting edges, an enclosed area is provided between the strands and the two forming parallel welds. By providing an enclosed area between the strands, the heat in the molten strands will cause the air in that area to expand, generating enough outward pressure on the strands to prevent the inseparable fusion of the strands which would otherwise occur when two molten nylon strands are brought into contact in the open air prior to any cooling and crystallization of the nylon polymer material in a quench bath. This pressure, however, is not so great as to prevent formation of the desired welds along the abutting edges of the two strands as occurred when the same configuration of edged strands were brought together in the cooling quench bath. In addition, proper alignment of the edged strands is readily achieved by bringing the strands together above the quench bath and directly below the extrusion die so as to prevent any twisting of the individual strands. The result is a flexible cutting line of single piece construction comprised of two monofilament nylon strands which define a plurality of cutting edges thereon and are bonded together by a pair of readily severable welds.

It is the principal object of the present invention to provide a process and apparatus for economically manufacturing a flexible nylon cutting line comprised of two edged strands joined together in a side-by-side relationship along readily severable bond for use in flexible-line trimmer heads of the type employing two or more cutting lines.

Other objects and advantages of the present invention will become readily apparent from the following detailed description taken in conjunction with the accompanying drawings.

IN THE DRAWINGS

FIG. 9 is an enlarged schematic view of the filter assembly, metering pump, extrusion pot and first quench tank and illustrating the initial forming steps of double-strand edged monofilament line in accordance with the present invention.

DESCRIPTION OF THE PREFERRED EMBODIMENT

Figure 1:
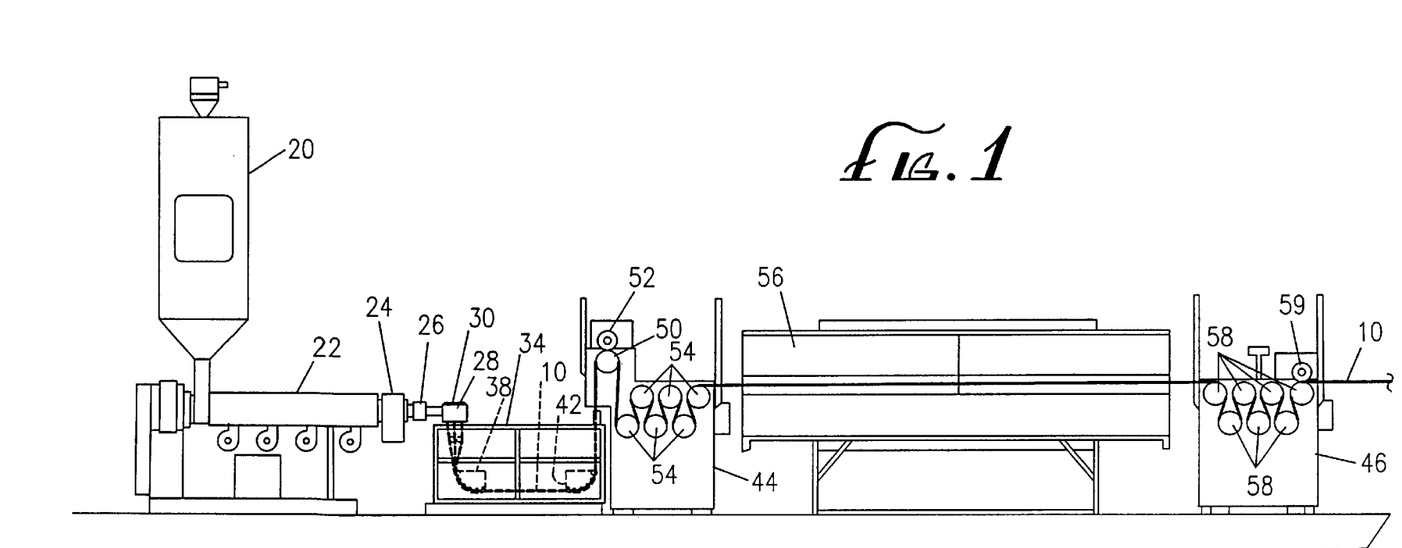
FIG. 1 is a schematic representation of a first portion of the manufacturing process of the present invention.
Figure 2:
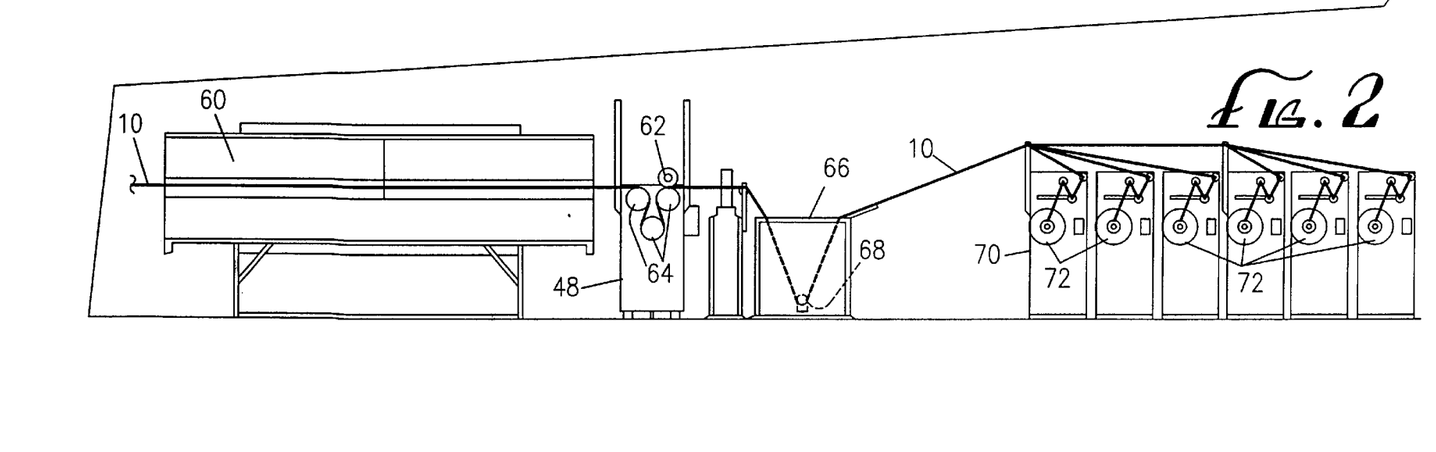
FIG. 2 is a schematic representation of the remainder of the manufacturing process of the present invention.
Figure 4:
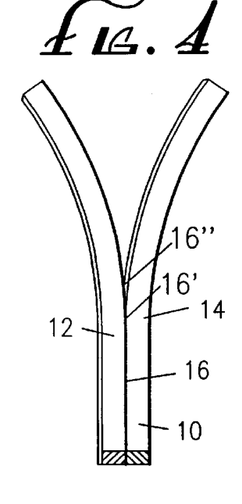
FIG. 4 is a perspective view of an end portion of a length of double-strand edged line formed in accordance with the present invention showing the end portion thereof being separated into its component strands for projection through opposed eyelets in the side wall of a rotary trimmer head housing.
Figure 5A:
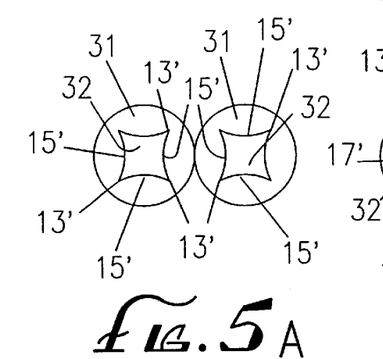
FIGS. 5A–5D are enlarged plan views of pairs of apertures in extrusion dies employed in the present invention, illustrating the relative orientation of the apertures and the aperture configurations producing the strand configurations illustrated in FIGS. 3A–3D.
Figure 5B:
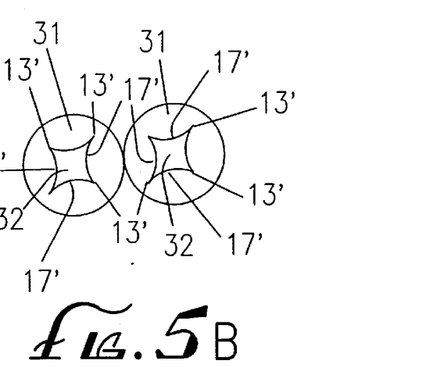
Figures 5C, 5D:
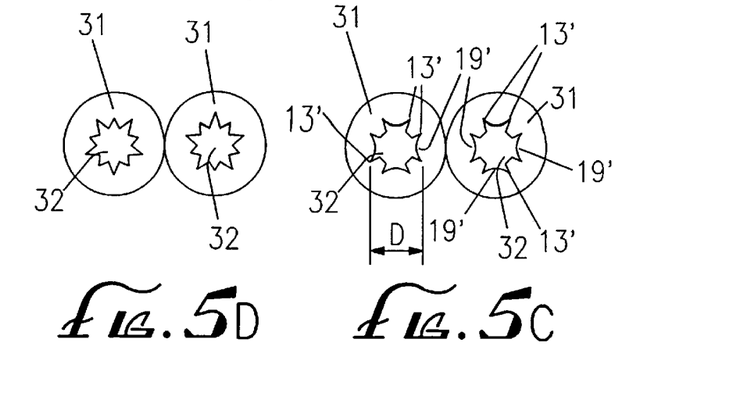
Figure 6:
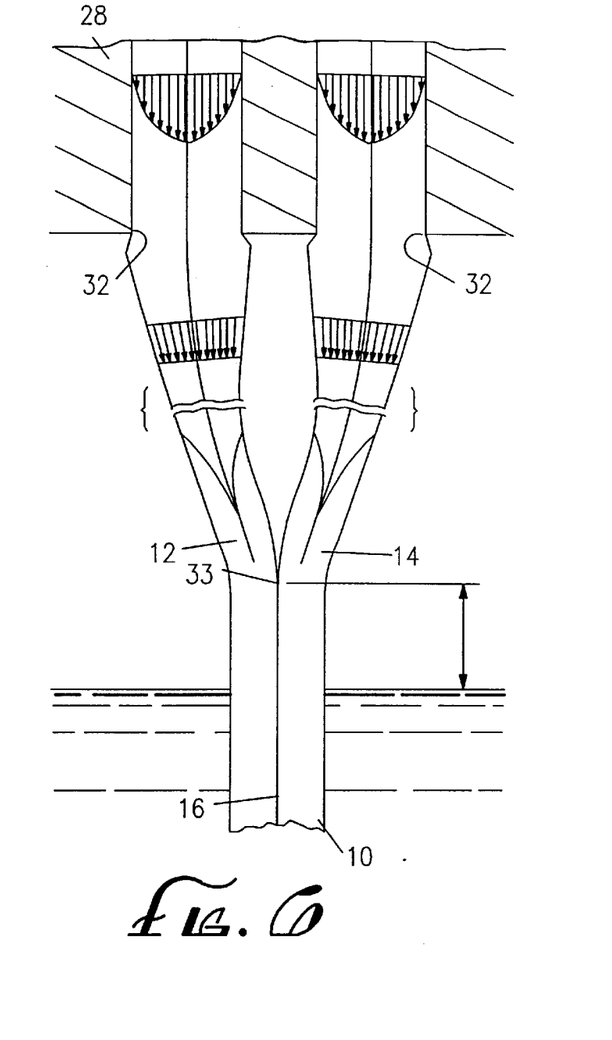
FIG. 6 is a further enlarged schematic representation of the initial forming and bonding together of a pair of monofilament edged strands in accordance with the present invention.
Figure 7A:
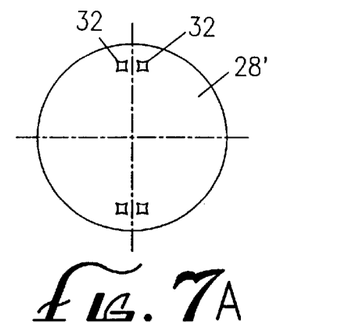
FIGS. 7A–7D are bottom plan views of extrusion dies for use in the process of the present invention illustrating different hole patterns for producing different quantities of double-strand monofilament edged lines, FIG. 7D being enlarged slightly for clarification purposes.
Figure 7B:
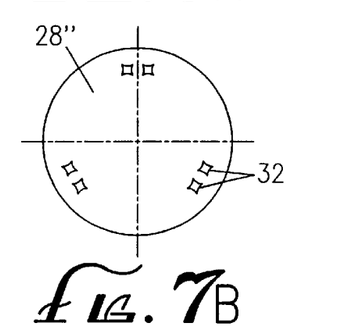
Figure 7C:
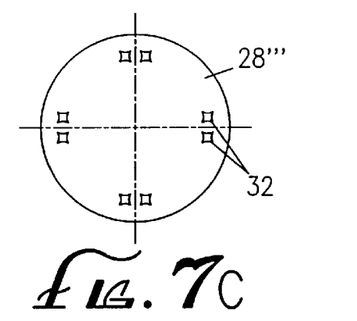
Figure 7D:
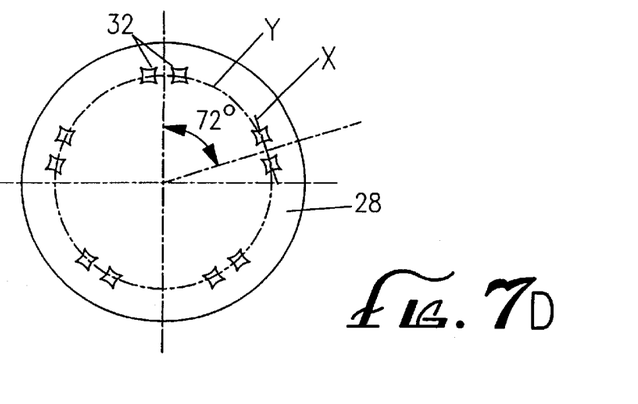
Figure 8A:
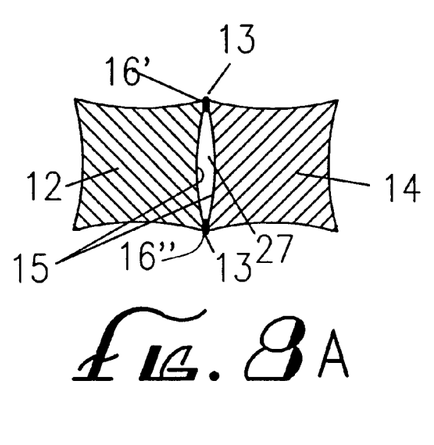
FIGS. 8A–8D are enlarged cross-sectional views of pairs of bonded strands having been extruded through the aperture pair configurations illustrated in FIGS. 5A–5D.
Figure 8B:
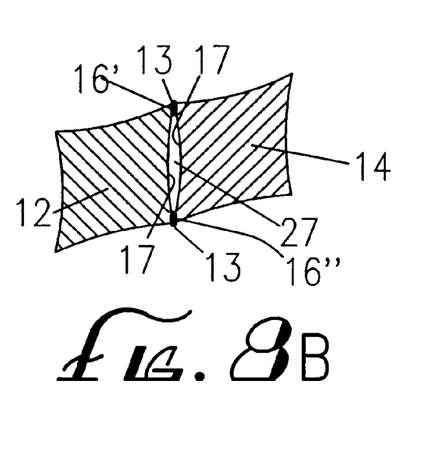
Figure 8C:
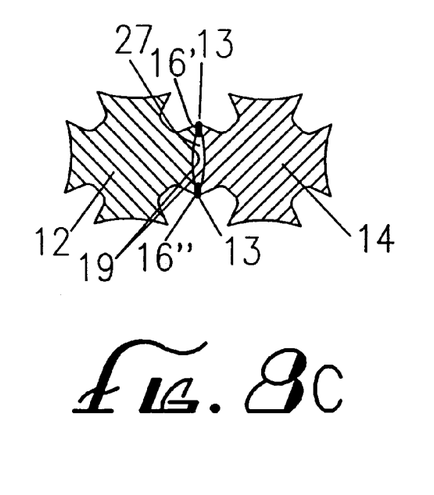
Figure 8D:
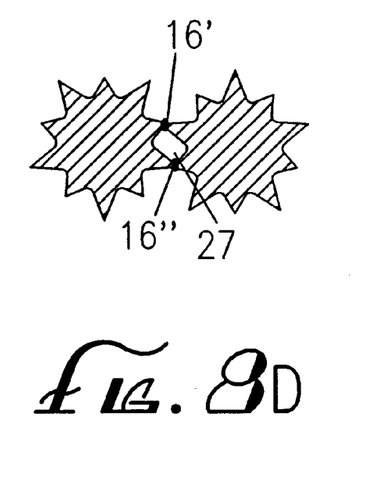

Referring now in detail to the drawings, the process of the present invention is schematically represented in FIGS. 1 and 2. The result of the process is a double or dual-strand monofilament edged line 10 comprised of a pair of monofilament edged strands 12 and 14, preferably of uniform cross-section, which are bonded together in a side-by-side relationship along a pair of spaced-apart thin severable welds 16' and 16" as seen in FIG. 4. As will be described, welds 16' and 16" are formed along pairs of abutting projecting edges 13 which extend the length of line 10 and are on opposed sides of an enclosed area 27 formed between the two strands as seen in FIGS. 8A–8D. Area 27 is defined by the opposed surfaces of the two strands which extend between welds 16' and 16" and are recessed with respect to the welds. The configuration of the opposed surfaces will vary depending on the cross-sectional configuration of the edged strands.

While welds 16' and 16" secure strands 12 and 14 together in a parallel juxtaposition, they are readily severed by shearing forces. Thus, pulling the extended ends of strands 12 and 14 of the line 10 will cause the strands to readily separate along the welds 16' and 16" as illustrated in FIG. 4.

Accordingly, the double-strand line 10 can be easily wound about a trimmer head spool and stored thereon without risk of strand crossover or tangling due to the continual side-by-side securement of the component strands 12 and 14. Because the end portion of the line 10 can be readily separated by a shearing force into its component strands along a selected length, the two strands are easily separated and extended from the spool in opposed directions for insertion through opposed line guides or eyelets in the side wall of the trimmer head housing (not shown). The readily severable bond provided by welds 16' and 16" also allows the strands to be easily indexed through the opposed line guides in automatic feed and bump feed leads during use.

To obtain the aforesaid properties, line 10 is preferably constructed of a nylon copolymer material such as no. 8218 manufactured by Allied Signal, Inc. While other material compositions could be employed in carrying out the present invention, this material, which is solid phase polymerized in a pellet configuration, has been found to produce strong, durable and impact resistant cutting strands and bonding welds having high tensile and low shear strength to provide the desired features discussed above. For line 10 comprised of strands having a transverse dimension (hereinafter referred to as the diameter) up to about 0.080 in., a less expensive nylon homopolymer could be used such as no. 2065 by Allied Signal, Inc. Acceptable results can also be obtained at a lower cost in diameters over 0.080 in. by employing mixes of nylon copolymers and homopolymers. The use of the nylon copolymer material, without the addition of any homopolymer material, however, has been found to provide the strongest and most durable line.

Figure 3A:
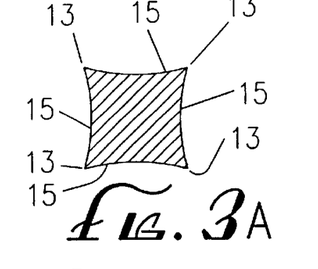
FIGS. 3A–3D are enlarged cross-sectional views of different configurations of edged strands formed in accordance with the present invention.
Figure 3B:
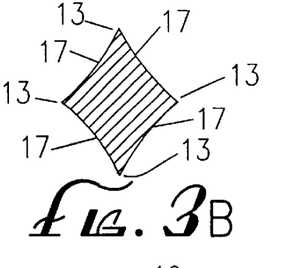
Figure 3C:
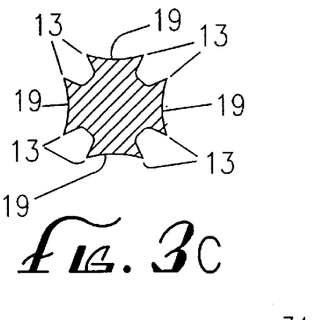
Figure 3D:
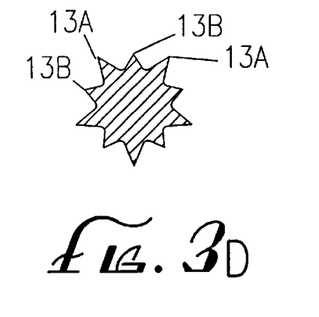

The strands 12 and 14 of line 10 can be formed in a wide variety of edged configurations. Examples of different cross-sectional configurations of edged strands which can be formed in accordance with the present invention are illustrated in FIGS. 3A–3D. Each configuration defines a plurality of longitudinally extending, outwardly projecting cutting edges 13 which are preferably equidistantly spaced about the circumference of the strand. FIG. 3A illustrates a strand having a substantially square cross-section. FIG. 3B illustrates a substantially diamond-shaped strand. FIG. 3C illustrates a generally cross-shaped strand configuration marketed by Proulx Manufacturing, Inc. of Rancho Cucamonga, Calif. under the trademark Crossfire. FIG. 3D illustrates a generally star-shaped configuration of an edged strand in which alternating edges 13A are recessed to provide a new set of sharp cutting edges when the more outwardly projecting edges 13B become worn through use. These examples are not all inclusive, but merely representative of numerous different cross-sectional configurations of edged strands which could be formed in accordance with the present invention. The configurations illustrated in FIGS. 3A and 3B differ from true square and diamond-shaped configurations in that the side walls thereof are slightly concave and not flat so that the corners of the strands define the projecting edges necessary to form line 10 as will be further explained. To the naked eye, such strands appear square or diamond-shaped.

In manufacturing the double-strand line 10 in accordance with the present invention, a supply of nylon copolymer material is disposed in a hopper 20 and selectively fed through an extruder 22, a screen changer/filter assembly 24, a metering pump 26 and an extrusion die spin pack 28 disposed within pot 30. For each length of double-strand line 10 to be produced, extrusion die 28 defines a pair of spaced apertures 32. The aperture configurations in extrusion die 28 which produce joined pairs of the particular strand configurations shown in FIGS. 3A–3D are illustrated in FIGS. 5A–5D respectively. As seen therein, the configurations of the apertures 32 generally correspond to the final cross-sectional shapes of the strands except for size due to the drawing down of the extruding strands and the radial expansion of the extruded polymeric material due to die swell. Inwardly tapered recessed areas 31 are disposed in the upper surface of die 28 about each of the apertures 32 therein to enhance material flow through the die.

The phenomenon of die swell is significant in forming edged strands having concave surfaces and flat surfaces which are perpendicular or substantially perpendicular to an axis passing through the surface and the center of the strand. To form such flat surfaces in a strand configuration requires a convex aperture wall in the die (or concave as viewed from the aperture) due to the swelling of the nylon material as the material relaxes upon passing through the die apertures. Similarly, to provide a slightly concave surface in an extruded strand requires a more severe arc in the surface of the die. For example, to form the slightly concave strand walls 15, 17 and 19 in the strand configurations illustrated in FIGS. 3A–3C requires the use of the more acutely curved aperture sides 15', 17' and 19' illustrated in FIGS. 5A–5C respectively. As seen from comparing FIGS. 3C and 5C and 3D and 5D, the radial swelling is not significant in forming rounded or acutely angled or pointed surfaces such as edges 13 in FIG. 3C and 13A and 13B in FIG. 3D. Rounded surfaces simply become larger in diameter as a result of die swell which can be offset, if necessary, by a proportionate reduction in aperture size or during the drawing down of the forming strands. Acutely angled surfaces are employed to define projecting edges, as in star-shaped strands, and the radial expansion of die swell only has a significant effect at the base of the projecting edges. The projecting edges themselves are virtually unaffected.

Examples of dies having different numbers of aperture pairs are shown in FIGS. 7A–7D. The extrusion die 28' illustrated in FIG. 7A will produce two lengths of double-strand monofilament line 10. Die 28" illustrated in FIG. 7B will produce three separate lengths of double-strand line 10. Die 28''' illustrated in FIG. 7C will produce four separate lengths of dual line 10, etc. It is preferable to space each pair of apertures 32 substantially equidistantly apart on the die to minimize any inadvertent contact between the pairs of strands being extruded therethrough and to avoid creating any pressure imbalances. Accordingly, the pairs of apertures 32 are preferably aligned along a constant radius circle (as will be explained) as opposed to being disposed in radial alignment wherein the more outwardly disposed aperture(s) would have less through-put.

The relative orientation of the apertures 32 in each pair of apertures is very important. The apertures 32 in each pair are oriented in the extrusion die 28 such that two projecting edges 13' of one aperture are in axial alignment with two projecting edges of the other aperture and the connecting wall surfaces 15', 17' or 19' extending between the aligned edges 13' are in opposed and recessed disposition, as illustrated in FIGS. 5A–5D. The spacing between the axially aligned edges 13' of the two apertures should be between 1/16 and 3/8 of an inch apart with the preferred spacing being 1/8 inch. So aligned, the pairs of apertures are preferably positioned in the die such that they are spaced equidistantly apart and a line X (See FIG. 7D) passing through the centers of each pair of apertures would be tangent to a constant diameter circle Y. Thus, in a die 28 having five pairs of apertures, a preferred embodiment (see FIG. 7D), the corresponding apertures in each successive pair would be 72° apart as measured from the center of the die. The purpose of such orientation is to achieve edge-to-edge parallel contact between the extruding strands along aligned pairs of projecting edges and to minimize twisting of the strands prior to crystallization, as will be explained.

As in the extrusion of single-monofilament line, the diameters of the individual apertures 32 in die 28 should be at least fifty percent greater than the desired final strand diameter. By way of example, in the aperture configuration illustrated in FIG. 5C, a diameter D across one of the apertures of 0.265 inches is used to provide strands having the cross-sectional configuration illustrated in FIG. 3C and corresponding diameters of both 0.095 and 0.105 inches. Variations in strand size can be obtained with a given aperture size by regulating the metering pump 26 and the line speed as in the manufacture of conventional single-strand monofilament line.

In forming line 10, the nylon polymeric material is first extruded through the pairs of apertures 32 in extrusion die 28, forming a corresponding number of pairs of molten monofilament strands 12 and 14. Each pair of molten strands is directed downwardly from die 28 to a collecting guide 29 which is disposed slightly above the surface of the water within a quench tank 34. At the collecting guide 29, the molten strands are aligned and pressed gently together along their opposed projecting edges 13 to initiate the bonding together of the two strands 12 and 14 along those edges. Each pair of abutting strands is then directed in a side-by-side disposition and edge-to-edge contact downwardly into the quench tank 34.

Quench tank 34 is filled with water which is maintained within the range of about 40° to 100° F., depending on the material being used, to effect crystallization of the nylon strands as they pass through the cooler water. If the line 10 is being constructed of the preferred nylon copolymer no. 8218 identified above, the water in tank 34 should be maintained within the range of 40° to 80° F. For smaller diameter line constructed of this material, such as 0.065–0.080 in., the water temperature should preferably be about 60° to 70° F. and most preferably at about 60° F. For larger diameter line such as 0.095–0.105 in. the water temperature should preferably be at about 70° to 80° F. and most preferably about 70° F. If the line were being formed of a nylon homopolymer, the water temperature need not be quite as cool as nylon homopolymers crystalize more quickly. For example, if the aforesaid nylon homopolymer no. 2065 were being used, the water should be maintained from about 70° to 100° F. Because this material crystallizes quickly, a preferred water temperature of 70° to 80° F. is employed with small diameter line such as 0.065–0.080 in. and most preferably the temperature should be about 70° F. With larger diameter line such as 0.095–0.105 in., the water temperature should be about 80° to 100° F. and most preferably about 80° F. A water cooling apparatus (not shown) is employed in tank 34 to maintain the water at the desired quenching temperature.

The collecting guide 29 (see FIGS. 11 and 12) is mounted on the sides of quench tank 34 so as to be positioned directly below die 28 and is spaced about 8 to 9 inches below the die. In the configuration shown in the drawings, collecting guide 29 comprises a pair of roller bars 29A and 29B which are in horizontal alignment and spaced slightly apart. The bars are carried by lateral mounting brackets 47 and a plurality of raised ridges 31 are provided on each of the bars 29A and 29B so as to define a series of finger guides separating the individual curvilinear guide surfaces 29', 29", 29''' etc., on bars 29A and 29B and joining together and aligning the pairs of strands about one of the guide surfaces. As each pair of strands is directed from die 28 about one of the guide surfaces, e.g., 29' and between a pair of the spaced ridges 31 separating the individual guide surfaces, the ridges cause the strands in each pair thereof to be pressed gently together at 33 to initiate the formation of the welds 16' and 16" therebetween. Because the apertures 32 are configured and aligned as above-described, the two strands 12 and 14 in each pair will abut one another along their projecting edges 13, forming welds 16' and 16" which collectively bond together the abutting edges of the two strands. The collecting guide 29 is adjustably mounted so as to bring the strands together between approximately 1.0 to 0.25 inches above the upper surface of the cooing bath in tank 34.

As the molten strands 12 and 14 are brought together in edge-to-edge contact at 33 adjacent collecting guide 29, each pair of strands defines an enclosed area 27 between the two strands. The areas is bordered by the abutting edges 13 and the recessed, oppositely facing side walls 15, 17 or 19 of the two strands, as seen in FIGS. 8A–8D. The air entrapped in the enclosed area 27 between the two strands during the joining together of the strands is rapidly heated by the molten material, creating an increase in pressure between the abutting strands. This pressure build up urges the strands apart and prevents the strands from permanently fusing together.

The extruded pairs of joined strands are then directed in side-by-side disposition from collecting guide 29 directly into the cooling quench bath. The strands are pulled down to and about a guide 35 and a series of rollers 37 which are mounted in a spaced curvilinear disposition in a basket or carriage 38 adjustably mounted in the lower upstream end of the quench tank 34. Guide 35 is of the same configuration as guide bars 29A and 29B and defines a plurality of raised annular ridges 36 thereon which are spaced apart and define a second series of finger guides for maintaining the alignment of the pairs of joined strands in a spaced parallel array. The finger guides defined by both the first and second roller guides 29 and 35 could, of course, be formed by other means such as a plurality of annular or arcuate channels formed in a solid bar extending across carriage 38. The pairs of joined strands extend from carriage 38 in parallel alignment proximate the bottom of tank 34 and about a second plurality of rollers 39 mounted on a second carriage 42. The last roller 39' on carriage 42 preferably defines a guide and is of the same configuration as guides 29 and 35. From carriage 42, the pairs of strands are directed upwardly out of the quench tank 34, and through a sponge assembly 41 which strips excess water from the strands and is provided with a comb guide to maintain the alignment of the joined strands to a first roll stand 44. A roll stand 44 pulls the parallel array of the forming lengths of double-strand line 10 from the extrusion die 28 through the quench bath 34 and cooperates with a second roll stand 46 and a third roll stand 48 to move the lengths of line 10 through the forming process as will be explained.

An adjustable mounting of collecting guide 29 on tank 34 is provided to enable one to vary slightly the vertical elevation of the guide above the surface of the quench water to adjust the strength of the welds 16' and 16" for differently configured and sized strands. For strands having the configuration illustrated in FIGS. 3C and 8C, a diameter of 0.095 inches and being formed with the nylon copolymer no. 8218 identified earlier herein, positioning guide 29 such that the strands are brought into contact at about 0.5 inches above the surface cooling bath provides ideal welds. For smaller sized strands this spacing could be increased slightly and for larger strands the guide 29 could be adjusted to move the contact points 33 slightly closer to the water. This adjustability can be provided by a pair of flat bars 47 vertically mounted within tank 34 adjacent the opposite side walls thereof. Bars 47 are provided with a pair of closely spaced apertures 47' or aligned slots which are adapted to receive threaded fastening members whereby the guide 29 can be secured in place at the desired elevation on the tank. Other adjustable mounting means could, of course, also be employed.

The carriages 38 and 42 are similarly adjustably mounted in tank 34 to accommodate changes in the temperature of the cooling bath and different line sizes. Smaller line will quench more quickly to obtain the desired results. Raising the carriages within the tank will shorten the quench time. The water within the tank is also heated by the semi-molten strands moving therethrough. As the temperature of the water increases, the carriages 38 and 42 can be lowered slightly, if necessary, to provide comparable cooling of the strands.

Figure 10:
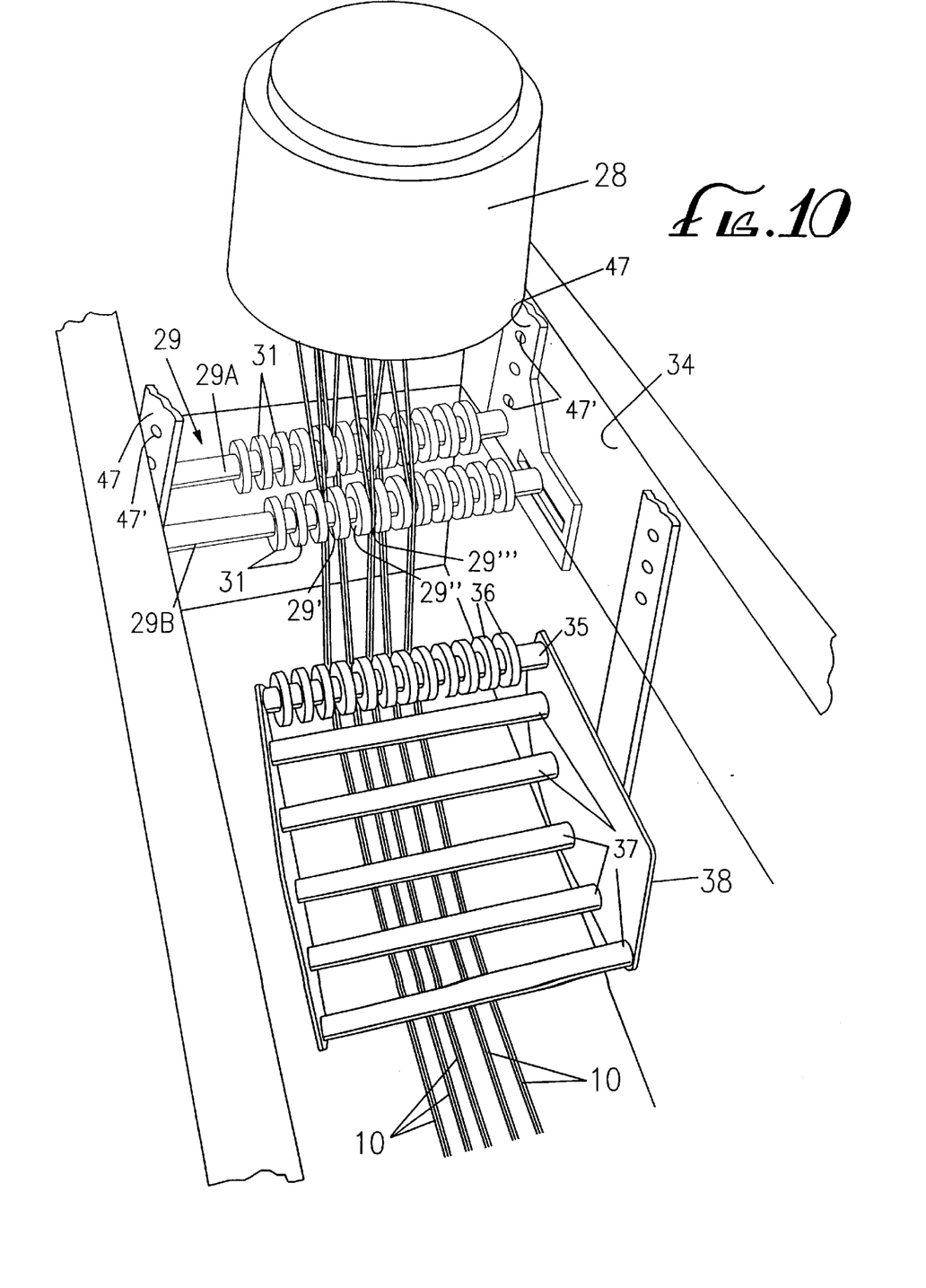
FIG. 10 is a perspective view of the upstream portion of the first quench tank showing the collecting guide and basket guide mounted therein for directing the lengths of double-strand edged line through the tank.
Figure 11:
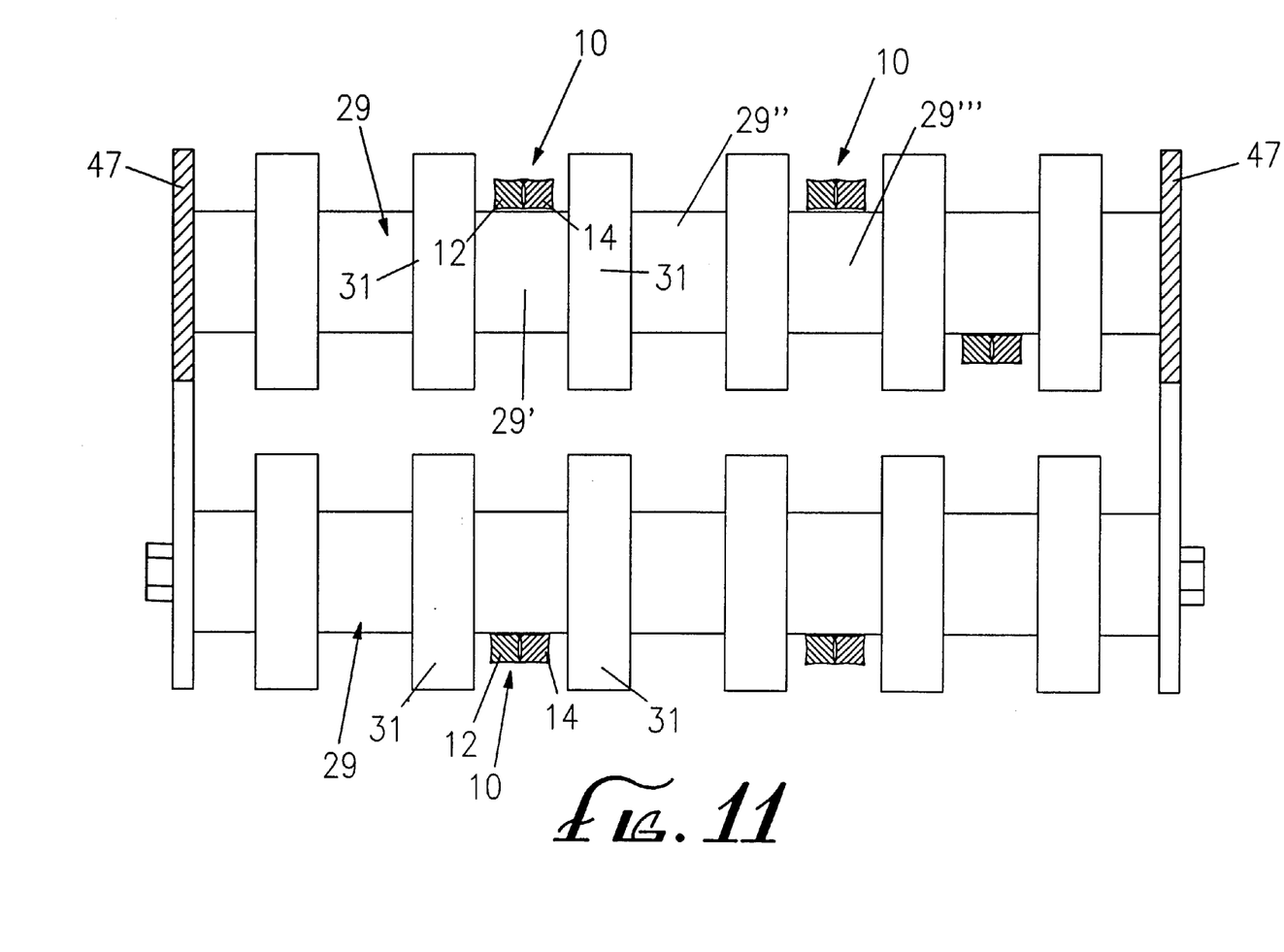
FIG. 11 is a plan view of the preferred embodiment of the collecting guide employed in the process of the present invention to produce five pairs of joined edged strands.

It should also be noted that different configurations of collecting guide 29 could also be employed. The collecting guide 29 illustrated in FIGS. 10 and 11 is particularly configured so as to cooperate with a die configuration having five pairs of apertures 32 to minimize any twisting of the freshly extruded molten strands as the strands pass from the extrusion die in closely spaced parallel disposition to an abutting disposition adjacent one of the guide surfaces 29' on the collecting guide 29. As seen in FIG. 11, five pairs of strands 12 an 14 are shown as being collected on guide 29. As can also be seen from the five aperture pair configuration in die 28 shown in FIG. 7D, a minimal reorientation of the strands is needed to direct the strands from the aperture alignment in die 28 to the respective guide surfaces on collecting guide 29 shown in FIG. 12. The two parallel roller configuration of collecting die 28 could also be employed in extruding two and three pairs of strands. In a die having four pairs of apertures (see FIG. 7C), a differently configured collecting guide might be preferable to the configuration shown in the drawings to minimize strand twisting. Such a guide configuration could comprise, for example, four angularly spaced collecting guide rollers.

As the bonding pairs of strands extend from the collecting guide 29 into the quench bath and about guide 35 and rollers 37, the ridges 36 on the guide 35 maintain each pair of aligned and joined crystallizing strands together in edge-to-edge contact as they pass thereover. Thus, as roll stand 44 continually pulls the pairs of adjacent strands through the quench bath, the strands will continue to crystalize and the welds 16' and 16" will continue to form at points 33 and thus extend along and continuously bond together the pairs of strands 12 and 14 to form the lengths of double-strand line 10. Cross-sectional views of these bonded strands 12 and 14 (having configurations corresponding to the die apertures illustrated in FIGS. 5A–5D) are shown in FIGS. 8A–8D. Because the pairs of strands will continue to come together at points 33 and form continuous welds 16' and 16", it is not necessary to press the two strands together down stream of collecting guide 29. Guides 35 and 39 are employed to maintain the parallel alignment of the formed dual lines as they pass through the quench tank 34.

Roll stand 44, which pulls the joined pairs of strands through the quench bath, comprises an elevated drive roller 50 and a pinch roller 52 for pulling the joined strands upwardly from tank 34, and two rows of vertically and laterally spaced additional drive rollers 54 which cooperate with rollers 50 and 52. The drive rollers in each of the three roll strands are preferably constructed with a stainless steel outer surfaces, while the pinch rollers preferably have a hard rubber surface to provide the desired gripping and durability characteristics. As seen in FIGS. 1 and 9, the parallel array of spaced lines 10 extend from tank 34 between drive roller 50 and pinch roller 52, downwardly therefrom and about the two rows of drive rollers 54 and laterally therefrom into a first oven 56. The second roll stand 46 is disposed downstream of oven 56 and is comprised of two rows of vertically and laterally spaced drive rollers 58 and a pinch roller 59. Roll stand 46 pulls the parallel array of lines 10 from the first roll stand 44 and through oven 56.

To obtain the desired physical properties in line 10, it is important both to stretch the line while it is being heated in oven 56 and to obtain the desired degree of crystallization of the nylon polymer material prior to heating and stretching. Stretching the line during the heating step provides parallel orientation of the molecular structure within the two strands 12 and 14 of line 10 and is achieved by providing a differential between the rotational velocities of the drive rollers 50 and 54 in the first roll stand 44 and the drive rollers 58 in the second roll stand 46. All of the drive rollers in the three roll stands are preferably of the same size. Accordingly, by rotating the drive rollers 58 in the second roll stand 46 more rapidly than the drive rollers 50 and 54 in the first roll stand 44, the lines 10 are stretched as they are pulled through oven 56.

The amount of crystallization which occurs in the molten strands prior to heating and stretching is a function of the particular material being used, the temperature of the quench water and the quench time (time during which the line is submerged in the quench tank). The quench time depends on the velocity at which the lines are pulled through the tank and the length of underwater travel. From a commercial standpoint, it is desirable to maximize line output per unit time. This is preferably achieved in the present invention by extending the length of the quench tank 34 which allows the roll stands to operate at higher rotational velocities without decreasing quench time. It has also been found to be desirable to operate the roll stands at constant velocities and thus variations in the line material can be most easily accommodated by variations in the temperature of the quench water.

By way of example, when using a ten hole die to extrude concurrently five pair of double-strand lines 10 using the aforesaid preferred nylon copolymer no. 8218, wherein the strands 12 and 14 are 0.080 inch in diameter, the diameters of die holes 32 are each 0.176 inch. The water temperature in tank 34 is preferably 60° F. The vertical spacing between the lower face of the extrusion die 28 in pot 30 and the surfaces of the water in tank 34, which is referred to as the air gap, is about 4 to 9 inches depending on the viscosity of the material used, the diameter of the strands being extruded and the draw-down ratios employed. The larger the diameter of the strands being formed and the less the draw-down ratio, the shorter the air gap. More viscous melts will require larger air gaps. To form welds of desired strength between the strands, the strand contact points 33 are each about 0.5 inches above the surface of the water as noted earlier herein. For very light welds between the strands, this depth could be decreased to about 0.25 inches. The melt temperature is about 420 to 480° F. and the quench tank 34 is about six feet in length by three feet in depth. The rotational velocity of the drive rollers in the first roll stand 44 is 44.1 feet per minute. To provide the proper orientation of the molecular structure of the two stands in each length of line 10 so as to achieve the desired line strength and durability characteristics, oven 56 is maintained at about 580° F. and the ratio of the relative rotational speeds of the drive rollers 58 in the second roll stand 46 to the speed of the drive rollers 50 and 54 in the first roll stand 44 is about 3.1 to 1. Accordingly, the rotational speed of the drive rollers 50 and 54 in the second roll stand 46 in the present example is 136.71 feet per minute.

Orienting the strands by aforesaid stretching and heating places considerable stress on the strands. To provide the desired strength and durability in the final product, it is desirable to relieve this stress. This is accomplished in the present invention by subjecting the pairs of joined strands 12 and 14 to a second heating step. In the second heating step, however, the joined strands are in a relaxed state as opposed to being stretched during the first heating step. To provide the second heating step, a second oven 60 is disposed downstream of the second roll stand 46. The third roll stand 48 is positioned downstream of the second oven 60 to pull the lengths of line 10 through oven 60. Roll stand 48 preferably comprises a pinch roller 62 and three drive rollers 64 vertically and horizontally spaced apart as shown in FIG. 2. To pull the lines 10 through oven 62 in a relaxed state, the drive rollers of roll stand 48 are rotated at a rate about two to ten percent slower than the drive rollers 58 of the second roll stand 46. Thus, in the above example, rollers 58 would be driven at 133.97 feet per minutes. The second oven 60 is maintained at a slightly lower temperature than oven 56, preferably about 540° F.

A second quench tank 66 is disposed downstream of the third roll stand 48 to moisten the monofilament line prior to spooling as spooled line is inhibited from absorbing from moisture in the air which is desirable in freshly extruded nylon line from a strength standpoint. A suitable line guide 68 is provided in the lower portion of quench tank 66 to define an underwater path for the line through tank 66. the water in tank 66 is maintained at about the same temperature as the water in tank 34 to cool the formed line prior to spooling. Finally, a conventional spooling assembly 70 is deployed in the assembly line downstream of quench tank 66 wherein each of the individual double-strand lines 10 formed by the aforesaid process are individually wrapped about separate spools 72 for storage and shipment. In the example set forth above, five separate spools would be wound with line 10 by assembly 70 and a total of 199.5 pounds of line 10 would be produced per hour, based on 402 feet of line per pound.

Various changes and modifications may be made in carrying out the present invention without departing from the spirit and scope thereof. Insofar as these changes and modifications are within the purview of the appended claims, they are to be considered as part of the present invention.

What is claimed is:

1. A flexible cutting line for use in rotary vegetation trimmers, said line being of single piece construction and comprised of two monofilament nylon polymer strands, each of said strands defining a plurality of circumferentially spaced and outwardly projecting edges thereon extending longitudinally along the strand, two of said edges on one of said strands being in parallel contact with two of said edges on the other of said strands so as to define a pair of parallel readily severable welds maintaining said strands in a side-by-side disposition.

2. The flexible cutting line of claim 1, wherein said two strands each have a square-shaped cross-section with four corners and concave portions between each pair of corners.

3. The flexible cutting line of claim 1, wherein said two strands each have a diamond-shaped cross-section with four corners and concave portions between each pair of corners.

4. The flexible cutting line of claim 1, wherein said two strands each have a star-shaped cross-section with at least three corners and recessed portions between each pair of corners.

5. The flexible cutting line of claim 1, wherein said two strands each have a cross-shaped cross-section with four extending legs and a recessed portion between each pair of legs.

* * * * *